United States Patent
Hoffmann et al.

(10) Patent No.: US 11,563,549 B2
(45) Date of Patent: *Jan. 24, 2023

(54) SELECTABLE BAND SUPPRESSION FOR A DISTRIBUTED ANTENNA SYSTEM

(71) Applicant: Andrew Wireless Systems GmbH, Buchdorf (DE)

(72) Inventors: Jaroslav Hoffmann, Donauwörth (DE); Peter Gunzner, Monheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 245 days.

This patent is subject to a terminal disclaimer.

(21) Appl. No.: 16/897,106

(22) Filed: Jun. 9, 2020

(65) Prior Publication Data

US 2020/0304276 A1 Sep. 24, 2020

Related U.S. Application Data

(63) Continuation of application No. 15/955,570, filed on Apr. 17, 2018, now Pat. No. 10,715,297.

(Continued)

(51) Int. Cl.
*H04L 5/00* (2006.01)
*H04B 7/022* (2017.01)
(Continued)

(52) U.S. Cl.
CPC ........... *H04L 5/0098* (2013.01); *H04B 7/022* (2013.01); *H04L 5/0048* (2013.01);
(Continued)

(58) Field of Classification Search
None
See application file for complete search history.

(56) References Cited

U.S. PATENT DOCUMENTS

| 6,570,858 B1 | 5/2003 | Emmons, Jr. et al. |
| 6,861,924 B2 | 3/2005 | Machui |

(Continued)

FOREIGN PATENT DOCUMENTS

| EP | 2509230 A1 | 10/2012 |
| GB | 2445992 A | 7/2008 |

(Continued)

OTHER PUBLICATIONS

European Patent Office, Communication pursuant to Article 94(3) from EP Application No. 18728867.5 from Foreign Counterpart to U.S. Appl. No. 16/897,106, dated Dec. 7, 2021, pp. 1 through 7, Published: EP.

(Continued)

*Primary Examiner* — Duc T Duong
(74) *Attorney, Agent, or Firm* — Fogg & Powers LLC (57) ABSTRACT

In one embodiment, a distributed antenna system comprises at least one master unit; at least one remote antenna unit coupled to the master unit and comprising a power amplifier to radiate a remote downlink radio frequency signal, the remote antenna unit further configured to receive a remote uplink radio frequency signal from at least one antenna, the remote downlink radio frequency signal comprises first and second downlink frequency bands and wherein the remote uplink radio frequency signal comprises first and second uplink frequency bands; a band suppression module comprising: a controller; an uplink band suppression element configured to apply an attenuation to suppress the first uplink frequency band in response to a signal from the controller; and a downlink band suppression element configured to apply an attenuation to suppress the first downlink frequency band in response to the signal from the band suppression controller.

20 Claims, 6 Drawing Sheets

Related U.S. Application Data (60) Provisional application No. 62/512,541, filed on May 30, 2017.

(51) Int. Cl.

| | | |
|---|---|---|
| *H04W 28/08* | (2009.01) | |
| *H04W 28/18* | (2009.01) | |
| *H04W 72/04* | (2009.01) | |
| *H04B 1/00* | (2006.01) | |
| *H04W 88/08* | (2009.01) | |

(52) U.S. Cl.
CPC ......... *H04W 28/085* (2013.01); *H04B 1/0053* (2013.01); *H04L 5/001* (2013.01); *H04W 28/18* (2013.01); *H04W 72/0453* (2013.01); *H04W 88/085* (2013.01)

(56) References Cited

U.S. PATENT DOCUMENTS

| | | |
|---|---|---|
| 2009/0316609 A1 | 12/2009 | Singh |
| 2011/0237182 A1 | 9/2011 | Stratford et al. |
| 2011/0249599 A1* | 10/2011 | Kaluzni ............... H04B 1/0057 370/281 |
| 2012/0314797 A1 | 12/2012 | Kummetz et al. |
| 2012/0329523 A1 | 12/2012 | Stewart et al. |
| 2014/0050212 A1 | 2/2014 | Braz et al. |
| 2015/0296527 A1 | 10/2015 | Ranson et al. |
| 2016/0198347 A1* | 7/2016 | Zhan ..................... H04B 1/40 455/23 |
| 2016/0233974 A1 | 8/2016 | Abramov et al. |
| 2016/0262145 A1* | 9/2016 | Park ...................... H04L 25/00 |
| 2016/0329957 A1 | 11/2016 | Schmid et al. |
| 2017/0026104 A1 | 1/2017 | Lange |
| 2018/0070323 A1* | 3/2018 | Zhan ..................... H04W 52/46 |
| 2018/0159563 A1* | 6/2018 | Khlat ...................... H01Q 3/24 |
| 2018/0269923 A1 | 9/2018 | Chang et al. |
| 2018/0351727 A1 | 12/2018 | Hoffmann et al. |
| 2019/0068250 A1 | 2/2019 | Kim et al. |
| 2019/0089452 A1* | 3/2019 | Ashworth .......... H04B 7/15571 |
| 2019/0166511 A1 | 5/2019 | Fackler et al. |
| 2019/0190564 A1* | 6/2019 | Cook ................. H04B 7/15535 |
| 2019/0260460 A1* | 8/2019 | Ashworth ................ H04B 1/18 |
| 2020/0028567 A1* | 1/2020 | Ashworth ........... H04B 1/0057 |

FOREIGN PATENT DOCUMENTS

| | | |
|---|---|---|
| WO | 2013123522 A1 | 8/2013 |
| WO | 2014144314 A1 | 9/2014 |
| WO | 2014175156 A1 | 10/2014 |
| WO | 2018003296 A1 | 1/2018 |

OTHER PUBLICATIONS

International Searching Authority, "International Search Report and Written Opinion from PCT Application No. PCT/EP2018/064213 dated Aug. 20, 2018," From PCT Counterpart of U.S. Appl. No. 15/955,570; pp. 1-16; Published in WO.

U.S. Patent and Trademark Office, "Notice of Allowance", U.S. Appl. No. 15/955,570, dated Mar. 18, 2020, pp. 1-9, Published: US.

U.S. Patent and Trademark Office, "Office Action", U.S. Appl. No. 15/955,570, dated Oct. 18, 2019, pp. 1-18, Published: US.

* cited by examiner

SELECTABLE BAND SUPPRESSION FOR A DISTRIBUTED ANTENNA SYSTEM

CROSS-REFERENCE TO RELATED APPLICATIONS

This application is a U.S. Continuation Patent Application claiming priority to, and the benefit of, U.S. patent application Ser. No. 15/955,570 titled "SELECTABLE BAND SUPPRESSION FOR A DISTRIBUTED ANTENNA SYSTEM" filed on Apr. 17, 2018, which claims priority to, and the benefit of, U.S. Provisional Patent Application No. 62/512,541 titled "SELECTABLE BAND SUPPRESSION FOR A DISTRIBUTED ANTENNA SYSTEM" filed on May 30, 2017, which are each incorporated herein by reference in their entirety.

BACKGROUND

A Distributed Antenna System (DAS) typically includes one or more master units that are communicatively coupled with a plurality of remote antenna units, where each remote antenna unit can be coupled directly to one or more of the master units or indirectly via one or more other remote antenna units and/or via one or more intermediary or expansion units. A DAS is typically used to improve the coverage provided by one or more base stations that are coupled to the master units. These base stations can be coupled to the master units via one or more cables or via a wireless connection, for example, using one or more donor antennas. The wireless service provided by the base stations can included commercial cellular service and/or private or public safety wireless communications.

In such a safety application, the safety wireless capacity provided by the DAS and the associated base-station-related equipment during normal operations may not be sufficient in emergency situations (such as a fire or security event) due to the presence of many additional users of the safety wireless service. As a result, it is common to provision a DAS used for such safety applications with additional base-station-related and DAS equipment (base stations, repeaters, etc.) that operate in a standby mode during normal operations but can be activated in emergency situations in order to provide increased safety wireless service capacity when necessary.

When planning for coverage within public safety relevant facilities by emergency services providers, the signal distributing infrastructure of the DAS may be shared between private and public safety services, each operating on their own frequency bands. For example the assigned licensed bands for the German Public Safety Digital Radio (BDBOS) TETRA network in Germany are 380-385 MHz for uplink communications and 390-395 MHz in downlink communications. For private safety services, different bands are used. For example, 415-420 MHz may be used for uplink communications and 425-430 MHz may be used for downlink communications for private safety services. Public safety signals are usually used by government agencies, such as police or fire, and public safety coverage is available from base stations provided across large geographic regions (for example, nationwide coverage). Private safety signal coverage, in contrast, is usually found within specific facilities or other areas of private service responsibility, for example, for the use of facility operator.

Subways, and specifically subway tubes, are one example of a facility where the communication infrastructure for both public and private safety services are extended and distributed. It is understood that subway trains may operate on tracks in tunnels below ground, and also on tracks above ground. However, while coverage for private safety services may be desired throughout the subway facility, distributing public safety communications coverage to above ground segments may cause interference with public safety communications coverage provided by other base stations operating in that area. As such, it may be required by regulations that public safety communications coverage by the subway operator's DAS should extend only to the below ground segments of the subway system to avoid interference with the signals from local public safety communications base stations operating close to the above ground segments.

It is therefore highly desirable for remote antenna units operating in above ground segments to be able to switch "off" the public safety band. It is also desirable to be able to selectively switch "on" the public safety band for those same remote antenna units for some emergency cases where the local base station that normally provides coverage around an above ground segment of a subway tube fails and cannot provide public safety coverage in that area. One standard solution to this problem is for each remote unit to have separately operated communication paths in each remote antenna unit for each band—one for public safety coverage and one for private safety coverage. Then, the power amplifier, low noise amplifier, and/or other electronics for uplink and downlink transport of the public safety communications band may be switched off for those remote units operating in above ground segments. This solution has a big disadvantage however in terms of price since two expensive power amplifier modules (in addition to other RF components) would be needed, one for each downlink safety band of the remote unit. For public safety operators, this redundant and expensive equipment remains dormant most of the time, except for when emergency situations require its operation.

SUMMARY

In one embodiment, a distributed antenna system comprises: at least one master unit configured to receive a base station downlink radio frequency signal and to transmit a base station uplink radio frequency signal; at least one remote antenna unit that is communicatively coupled to the at least one master unit, the remote antenna unit comprising a power amplifier and configured to radiate a remote downlink radio frequency signal from at least one antenna associated with the remote antenna unit, the remote antenna unit further configured to receive a remote uplink radio frequency signal from at least one antenna associated with the remote antenna unit, wherein the remote downlink radio frequency signal comprises a first downlink frequency band and a second downlink frequency band and wherein the remote uplink radio frequency signal comprises a first uplink frequency band and a second uplink frequency band; a band suppression module comprising: a band suppression controller; an uplink band suppression element controlled by the band suppression controller, wherein the uplink band suppression element is configured to apply an attenuation to suppress the first uplink frequency band in response to a signal from the band suppression controller; and a downlink band suppression element controlled by the band suppression controller, wherein the downlink band suppression element is configured to apply an attenuation to suppress the first downlink frequency band in response to the signal from the band suppression controller.

DRAWINGS

In accordance with common practice, the various described features are not drawn to scale but are drawn to emphasize. Reference characters denote like elements throughout figures and text.

DETAILED DESCRIPTION

In the following detailed description, reference is made to the accompanying drawings that form a part hereof, and in which is shown by way of specific illustrative embodiments. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide solutions for DAS operators to selectively disable public safety bands at select remote units without the need to for remote antenna units to be equipped with expensive multiple independent signal paths. The embodiments illustrated herein present solutions that adopt a novel perspective as to what it means for an operating band of a DAS to be "switched off". More specifically, when it is desired to disable a specific operating band, as opposed to disconnecting a signal path or de-powering down electronics associated with that operating band, the embodiments presented herein selectively reconfigure a signal path to suppress signals in that operating band. For example, if the signals for a public safety operating band are sufficiently suppressed to a level at or below signal levels that would be considered a permitted spurious RF emissions (while the private safety operating band remains operable) then the public safety operating band has effectively been turned off without leaving expensive electronics components sitting idle and unutilized within the remote antenna unit.

For example, in the field of commercial cellular communications, a signal emission having a power level of −36 dBm or less from a base station or remote antenna unit would be considered an acceptable spurious emission at the antenna. Other examples of acceptable maximum permitted levels of spurious emissions for different applications and radio frequency equipment may be found in International Telecommunications Union recommendation ITU-R SM.329-7 which is herein incorporated by reference in its entirety.

Assuming a remote antenna unit is designed to transmit from its antenna a downlink signal (DL1) at the output power level of +30 dBm per carrier in a first band, DL1, and that signal values below −36 dBm at the antenna port are considered an acceptable spurious emission, then to suppress the DL1 frequencies, the DL1 band could attenuated by 66 dB or more (+30 dBm−(−36 dBm)=66 dB) to reach values below −36 dBm at the antenna port. Thus, if this example remote antenna unit includes a band suppression module that selectively applies an attenuation of 66 dB to the DL1 band, it can effectively suppressed and turn off the DL1 band.

Figure 1:
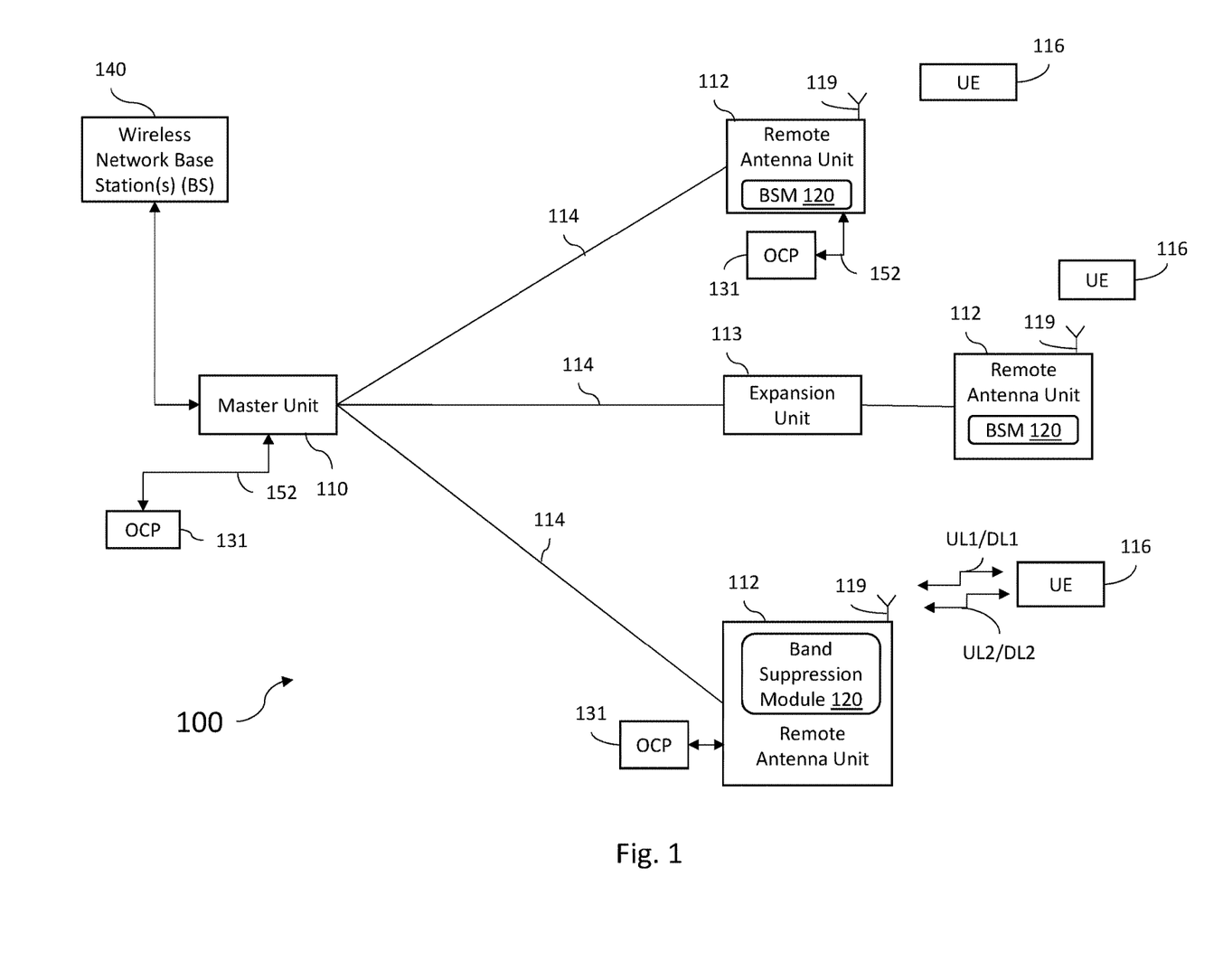
FIGS. 1, 1A, 1B and 1C are block diagrams illustrating a distributed antenna system of one embodiment of the present disclosure.

FIG. 1 is block diagram of one exemplary embodiment of a distributed antenna system (DAS) 100 where the remote antenna units utilize band suppression modules as described herein. As shown in FIG. 1, the DAS 100 comprises one or more master units 110 that are communicatively coupled to one or more remote antenna units 112 via one or more cables 114. In some embodiments, the cables 114 discussed herein may each operate bidirectionally with downlink and uplink communications carried over the cable. It should also be understood, however, that in other embodiments, a cable 114 may itself further comprise a pair of cables including an uplink cable for uplink communication, and a downlink cable for downlink communication. Each remote antenna unit 112 can be communicatively coupled directly to one or more of the master units 110 or indirectly via one or more other remote antenna units 112 and/or via one or more intermediary or expansion units 113.

Each master unit 110 is communicatively coupled to one or more base stations 140. One or more of the base stations 140 can be co-located with the respective master units 110 to which it is coupled (for example, where the base station 140 is dedicated to providing base station capacity to the DAS 100 and is coupled to the respective master units 110). Also, one or more of the base stations 140 can be located remotely from the respective master units 110 to which it is coupled (for example, where the base station 140 provides base station capacity to an area beyond the coverage area of the DAS 100). In this latter case, the master unit 110 can be coupled to a donor antenna and repeater or bi-directional amplifier in order to wirelessly communicate with the remotely located base station 140.

In this exemplary embodiment, the base stations 140 include one or more base stations that are used to provide public and/or private safety wireless services (for example, wireless communications used by emergency services organizations (such as police, fire and emergency medical services) to prevent or respond to incidents that harm or endanger persons or property). Such base stations are also referred to here as "safety wireless service base stations" or "safety base stations." The base stations 140 also can include, in addition to safety base stations, one or more base stations that are used to provide commercial cellular wireless service. Such base stations are also referred to here as "commercial wireless service base stations" or "commercial base stations."

The base stations 140 can be coupled to the master units 110 using a network of attenuators, combiners, splitters, amplifiers, filters, cross-connects, etc., (sometimes referred to collectively as a "point-of-interface" or "POI"). This network can be included in the master units 110 and/or can be separate from the master units 110. This is done so that, in the downlink, the desired set of RF channels output by the base stations 140 can be extracted, combined, and routed to the appropriate master units 110, and so that, in the upstream, the desired set of carriers output by the master units 110 can be extracted, combined, and routed to the appropriate interface of each base station 140. It is to be understood, however, that this is one example and that other embodiments can be implemented in other ways.

Figure 1A:
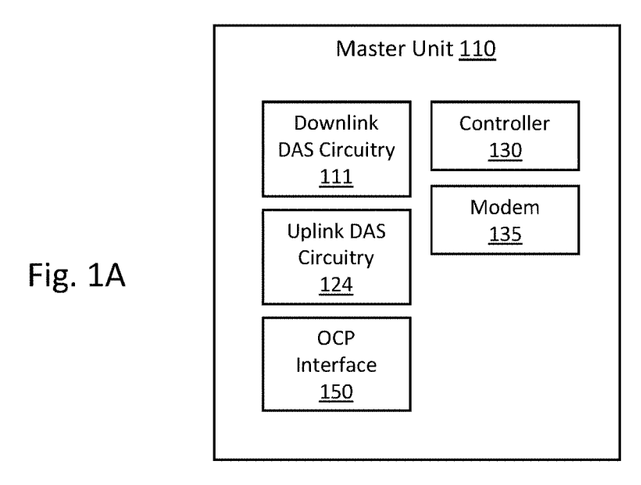

As shown in FIG. 1A, in general, each master unit 110 comprises downlink DAS circuitry 111 that is configured to receive one or more downlink signals from one or more base stations 140. These signals are also referred to here as "base station downlink signals." Each base station downlink signal includes one or more radio frequency channels used for communicating in the downlink direction with user equipment 116 (such as tablets or cellular telephone, for example)

over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The downlink DAS circuitry 111 in each master unit 110 is also configured to generate one or more downlink transport signals derived from one or more base station downlink signals and to transmit one or more downlink transport signals to one or more of the remote antenna units 112.

Figure 1B:
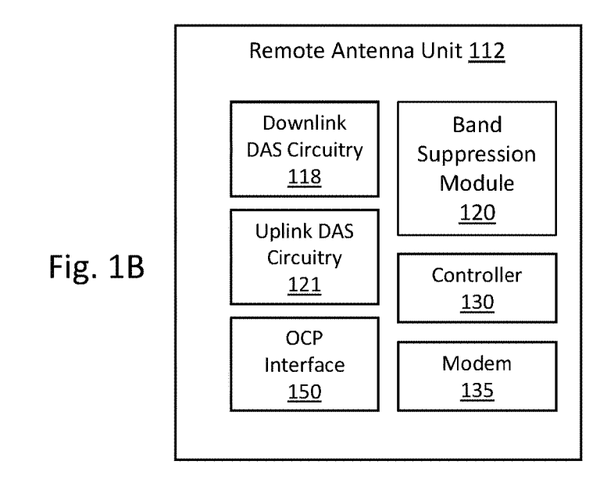

As shown in FIG. 1B, each remote antenna unit 112 comprises downlink DAS circuitry 118 that is configured to receive the downlink transport signals transmitted to it from one or more master units 110 and to use the received downlink transport signals to generate one or more downlink radio frequency signals that are radiated from one or more antennas 119 associated with that remote antenna unit 112 for reception by user equipment 116. These downlink radio frequency signals are analog radio frequency signals and are also referred to here as "remote downlink radio frequency signals." Each remote downlink radio frequency signal includes one or more of the downlink radio frequency channels used for communicating with user equipment 116 over the wireless air interface. In this way, the DAS 100 increases the coverage area for the downlink capacity provided by the base stations 140.

Also, each remote antenna unit 112 comprises uplink DAS circuitry 121 that is configured to receive via antenna 119 one or more uplink radio frequency signals transmitted from the user equipment 116. These signals are analog radio frequency signals and are also referred to here as "remote uplink radio frequency signals." Each uplink radio frequency signal includes one or more radio frequency channels used for communicating in the uplink direction with user equipment 116 over the relevant wireless air interface. The uplink DAS circuitry 121 in each remote antenna unit 112 is also configured to generate one or more uplink transport signals derived from the one or more remote uplink radio frequency signals and to transmit one or more uplink transport signals to one or more of the master units 110.

Each master unit 110 comprises uplink DAS circuitry 124 that is configured to receive the respective uplink transport signals transmitted to it from one or more remote antenna units 112 and to use the received uplink transport signals to generate one or more base station uplink radio frequency signals that are provided to the one or more base stations 140 associated with that master unit 110. Typically, this involves, among other things, combining or summing uplink signals received from multiple remote antenna units 112 in order to produce the base station signal provided to each base station 140. Each base station uplink signal includes one or more of the uplink radio frequency channels used for communicating with user equipment 116 over the wireless air interface. In this way, the DAS 100 increases the coverage area for the uplink capacity provided by the base stations 140.

Figure 1C:
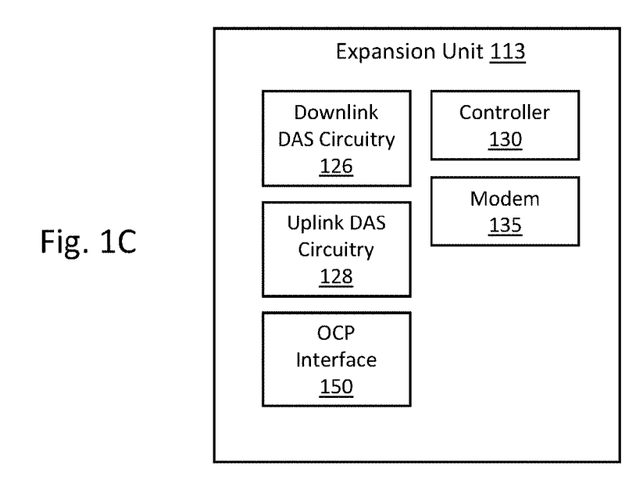

As shown in FIG. 1C, each expansion unit 113 comprises downlink DAS circuitry 126 that is configured to receive the downlink transport signals transmitted to it from the master unit 110 (or other expansion unit 113) and transmits the downlink transport signals to one or more remote antenna units 112 or other downstream intermediary units 113. Each expansion unit 113 comprises uplink DAS circuitry 128 that is configured to receive the respective uplink transport signals transmitted to it from one or more remote antenna units 112 or other downstream intermediary units 113, combine or sum the received uplink transport signals, and transmit the combined uplink transport signals upstream to the master unit 110 or other expansion unit 113. In some embodiments, one or more remote antenna units 112 may be coupled to the one or more master units 110 via one or more other remote antenna units 112 (for examples, where the remote antenna units 112 are coupled together in a daisy chain or ring topology). In such an embodiment, an expansion unit 113 may be implemented using a remote antenna units 112.

The downlink DAS circuitry 111, 118, and 126 and uplink DAS circuitry 124, 121, and 128 in each master unit 110, remote antenna unit 112, and expansion unit 113, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 111, 118, and 126 and uplink DAS circuitry 124, 121, and 128 may share common circuitry and/or components. For example, some components (such as duplexers) by their nature are shared among the downlink DAS circuitry 111, 118, and 126 and uplink DAS circuitry 124, 121, and 128.

The DAS 100 can use either digital transport, analog transport, or combinations of digital and analog transport for generating and communicating the transport signals between the master units 110, the remote antenna units 112, and any intermediary units 113. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 110 and the remote antenna units 112), or combinations of analog and digital transport.

Each unit 110, 112, 113 in the DAS 100 can also comprises a respective controller 130. The controller 130 is implemented using one or more programmable processors that execute software that is configured to implement the various features described here as being implemented by the controller 130. The controller 130, the various features described here as being implemented by the controller 130, or portions thereof, can be implemented in other ways (for example, in a field programmable gate array (FPGA), application specific integrated circuit (ASIC), etc.).

Each controller 130 is configured to monitor and control the operation of the associated unit. Each controller 130 is also configured to send and receive management data over the DAS 100. In one embodiment, each unit 110, 112, 113 in the DAS 100 also comprises a modem 135 that is configured to send and receive management data over the DAS 100 by modulating and demodulating one or more carrier frequencies that are used for the purpose of communicating management data. In some embodiments (for example, where digital transport is used in the DAS), a separate modem 135 for modulating and demodulating management data is not used and, instead, the management data is combined with the digital DAS transport data before being supplied to the transport transceiver or other physical layer device.

One or more of the units 110, 112, 113 in the DAS 100 also comprise an interface 150 to couple the controller 130 in that unit 110, 112, 113 to an operator control panel 131 that is deployed near that unit 110, 112, 113. The interface 150 is therefore also referred to here as an "OCP interface 150." Each such unit 110, 112, 113 can include an appropriate connector to attach a cable 152 (also referred to here as an "OCP cable 152") that is used to couple the unit 110, 112, 113 to the OCP 131. In general, each OCP 131 can be connected to the nearest unit 110, 112, 113 of the DAS 110.

As mentioned above, in addition to potentially providing commercial connectivity to users via consumer bands, DAS 110 also distributes public safety connectivity coverage and private safety communication coverage. In the exemplary embodiment shown in FIG. 1, each remote unit 112 includes a band suppression module (BSM) 120 that selectively applies an attenuation to specific uplink and/or downlink bands to effectively turn off those bands.

Figure 2:
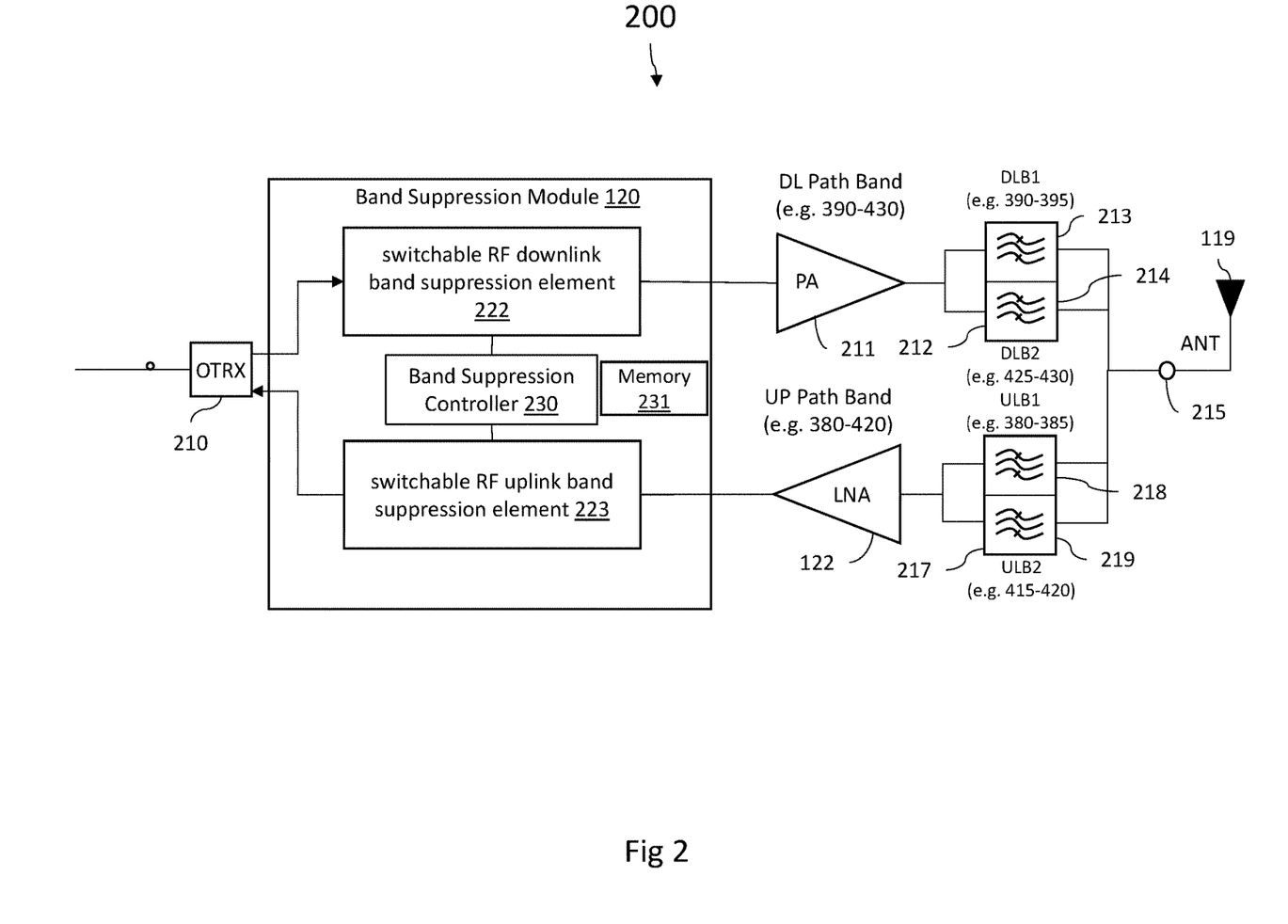
FIGS. 2, 2A, 2B and 2C are block diagrams illustrating example remote antenna units of alternate embodiments of the present disclosure.

FIG. 2 is a simplified diagram illustrating remote antenna unit 200 of one embodiment of the present disclosure that may be used to implement any one of the remote units 112 of the DAS 100 described above in connection with FIG. 1 and operate in conjunction with the master unit 110 shown in FIG. 1. In the particular embodiment shown in FIG. 2, remote antenna unit 200 comprises least one optical transceiver interface (OTRX) 210 for communicating via optical fiber with the master unit 110. It should be appreciated that in other embodiments, the master unit 110 and remote unit 200 may communicate over other types of wiring or cables. Remote antenna unit 200 further comprises an RF power amplifier 211, a downlink signal diplexer 212, an antenna port 215 that is configured to couple to remote unit 200 to an antenna 119, an uplink signal diplexer 217, a low noise amplifier (LNA) 122, and a band suppression module 120. Power amplifier 211 power amplifies downlink signals to a desired power level and feeds it to antenna 119 to radiate to user equipment 116 (not shown in FIG. 2) via diplexer 212. Uplink radio frequency signals transmitted from user equipment 116 in the coverage area of the remote antenna unit 200 are received via the associated antenna 119 and provided to LNA 122, which amplifies the received uplink signals. The downlink signal diplexer 212 comprises a first band filter 213 that filters out signals having a frequency outside of the first DL band (DL1) and a second band pass filter 214 that filters out signals having a frequency outside of the second DL band (DL2). For example, in one embodiment, the DL1 band may pass through only public safety coverage signals (e.g. in the 390-395 MHz band) while the DL2 band may pass through only private safety coverage signals (e.g. in the 425-430 MHz band). As such, though the power amplifier 211 may output a broad range of amplified signals, only those signals in frequency bands for which DAS 100 is authorized to transmit will pass to the antenna port 215 and radiate from antenna 119. Similarly, the uplink signal diplexer 217 comprises a first band pass filter 218 and a second band pass filter 219. In one embodiment, the UL1 band may pass through only public safety coverage signals (e.g. in the 380-385 MHz band) while the UL2 band may pass through only private safety coverage signals (e.g. in the 415-420 MHz band). As such, the UL1 and UL2 signals received by antenna 119 may pass to the low noise amplifier without high power downlink signals saturating the uplink path electronics of the remote antenna unit 200.

Band suppression module 120 switches between two or more modes. For example, in a first mode, band suppression module 120 may be switched to selectively apply an attenuation to suppress the DL1 and UL1 bands (which may be associated with public safety coverage signals, for example) while allowing the DL2 and UL2 bands (which may be associated with the private safety coverage signals, for example) to pass. In a second mode, band suppression module 120 may be switched to allow DL1 and UL1 bands and the DL2 and UL2 bands to pass. In some embodiments, a third mode may optionally be provided to selectively apply an attenuation to suppress the DL2 and UL2 bands while allowing the DL1 and UL1 bands to pass.

Band suppression module 120, the various features described here as being implemented by the band suppression module 120, or portions thereof, can be implemented by RF electronics in combination with for example, control circuitry and/or code executed in a processor, in a field programmable gate array (FPGA), application specific integrated circuit (ASIC), etc. In the embodiment shown in FIG. 2, the band suppression module 120 includes at least one switchable RF downlink band suppression element 222, at least one switchable RF uplink band suppression element 223, and a band suppression controller 230. In some embodiments, the band suppression controller 230 may be implemented with electronics responsive to signals from the remote unit controller 130. In some embodiments, the band suppression controller 230 may be implemented at least in part as a software application executed by the controller 130. The downlink and uplink band suppression elements 222 and 223 may be implemented in varies ways, for example by switchable notch filters or band pass filters, or using hybrid couplers or circulators with switchable loads.

Figure 2A:
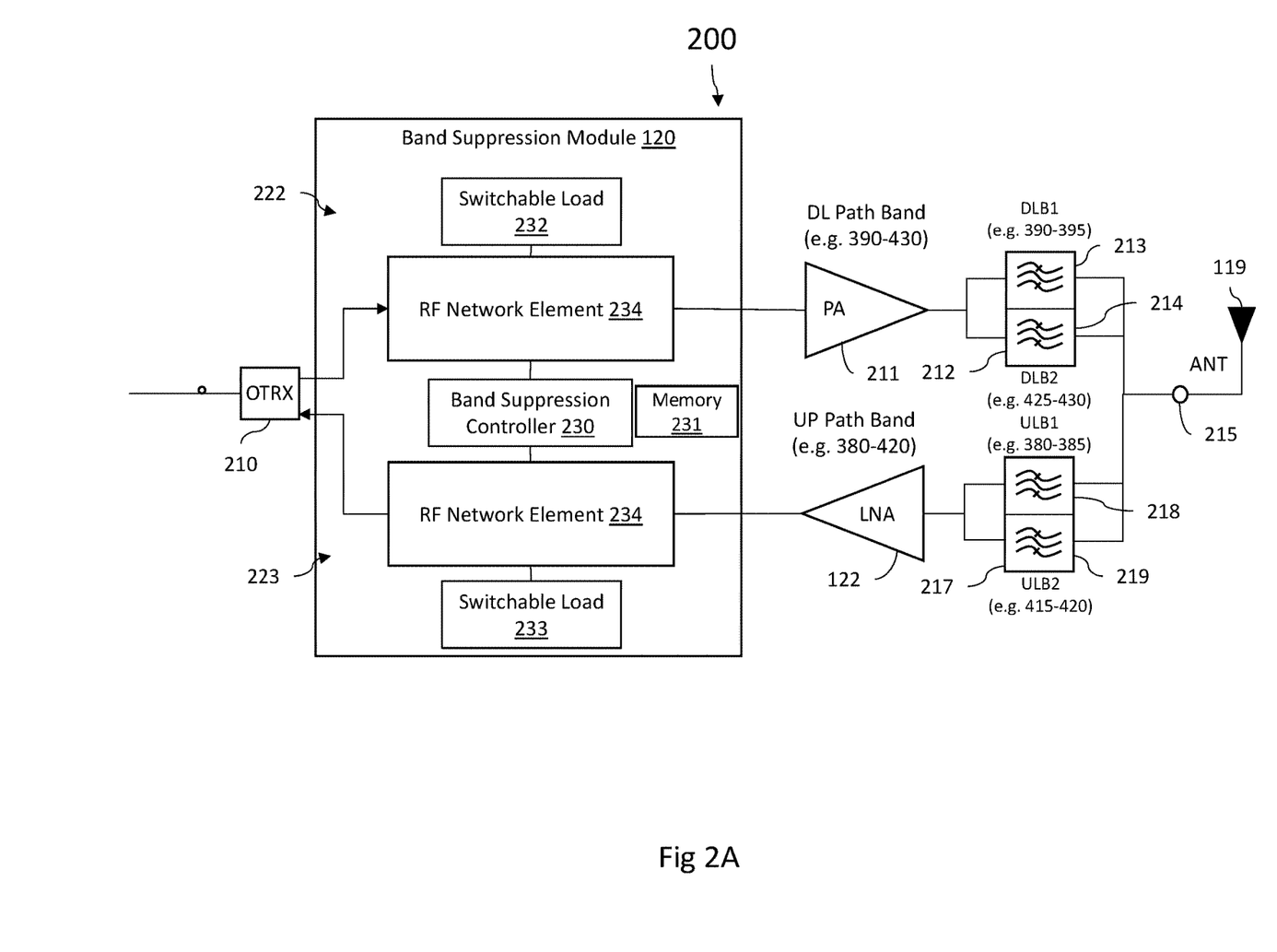

For example, FIG. 2A illustrates an example embodiment of the remote antenna unit 200 where the band suppression elements 222 and 223 of the band suppression module 120 are implemented using an RF network element 234 (such as a circulator or hybrid coupler, for example) with at least one switchable load 232 that may be selected or deselect by band suppression controller 230. For example, in one embodiment, a downlink signal having DL1 and DL2 band components is received at band suppression element 222. When suppression of public safety coverage signals is needed, band suppression controller 230 switches in the switchable load 232 so that the band suppression element 222 transmits the downlink signal having DL1 and DL2 into the switchable load 232. Switchable load 232 is tuned to absorb RF signals in the DL1 band so that any component of DL1 exiting out from switchable load 232 is attenuated below a threshold power level (for example, a level at which the signal would be considered a spurious emission). For the Example discussed above where the power amplifier 211 nominally delivers a +30 dBm signal per carrier to the antenna 119, the switchable load 232 attenuates the DL1 signal it receives by 66 dB so that the when attenuated DL1 signal is provided to the power amplifier 211 and then radiated by antenna 119, the transmitted power of the DL1 signal is at or below −36 dBm at the antenna port 215. These attenuation values are provided as illustrative examples only. One of ordinary skill in the art would be able to determine the threshold power level for the signal to be considered negligible (e.g. at or below a level of a spurious emission). It also should be appreciated that switchable load 232 may comprise multiple load elements coupled together in order to achieve the attenuation desired. In one embodiment, when suppression of public safety coverage signals is not desired, band suppression controller 230 can switch out the switchable load 232 so that the band suppression element 222 bypasses switchable load 232 and thus transmits the downlink signal having both DL1 and DL2 to power amplifier 211 so that DL1 and DL2 signals are provided to the power amplifier 211 and then radiated by antenna 119 at full nominal power (e.g. +30 dBm signal per carrier).

Similarly, in one embodiment, an uplink signal having UL1 and UL2 band components is received at band suppression element 223. When suppression of public safety coverage signals is needed, band suppression controller 230 switches in the switchable load 233 so that the band suppression element 223 transmits the uplink signal having UL1 and UL2 into the switchable load 233. Switchable load 233 is tuned to absorb RF signals in the UL1 band so that any component of UL1 exiting out from switchable load 233 is attenuated below a threshold power level (for example, a level at which the signal would be considered a spurious emission). One of ordinary skill in the art would be able to determine the threshold power level for the signal to be considered negligible (e.g. at or below a level of a spurious emission). It also should be appreciated that switchable load 233 may comprise multiple load elements coupled together in order to achieve the attenuation desired. When suppression of public safety coverage signals is not desired, band suppression controller 230 switches out the switchable load 233 so that the band suppression element 223 bypasses switchable load 233 and thus transmits the uplink signal having both UL1 and UL2 to the master unit 110, which then proceeds up to base station 140.

Figure 2B:
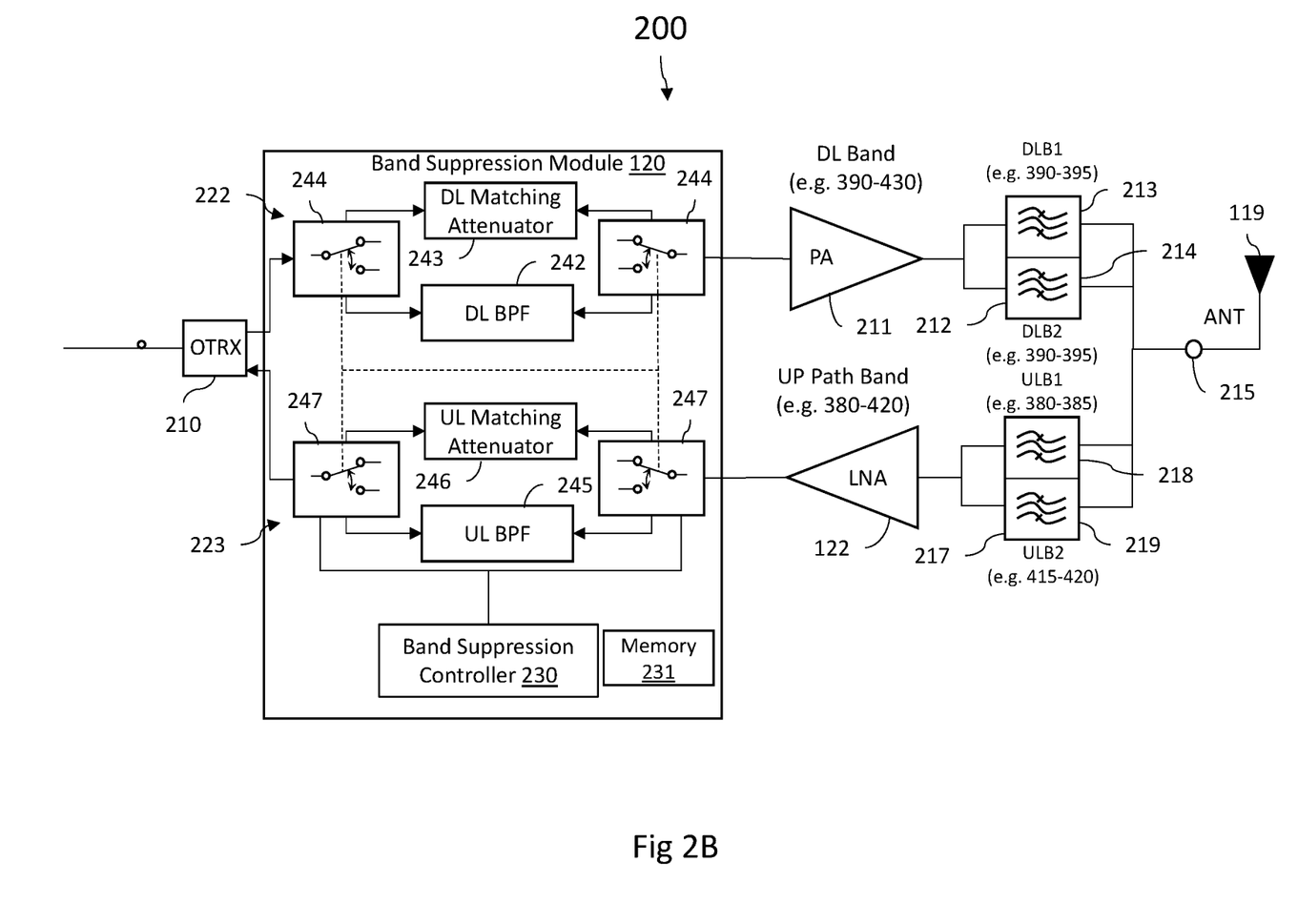

FIG. 2B illustrates another example embodiment of the remote antenna unit 200 where the band suppression elements 222 and 223 of the band suppression module 120 are implemented using RF band pass filters. In this example embodiment, band suppression module 120 comprises a downlink signal path that includes a downlink band pass filter element 242, a first matching attenuator 243 having an insertion loss equivalent to the insertion loss of the downlink band pass filter element 242, and one or more downlink suppression selection switches 244 coupled to and operated by the band suppression controller 230. Band suppression module 120 further comprises an uplink signal path that includes an uplink band pass filter element 245, a second matching attenuator 246 having an insertion loss equivalent to the insertion loss of the uplink band pass filter element 245, and one or more uplink suppression selection switches 247 coupled to an operated by the band suppression controller 230.

In one embodiment, a downlink signal having DL1 and DL2 band components is received at band suppression element 222. When suppression of public safety coverage signals is needed, band suppression controller 230 switches the one or more downlink suppression selection switches 244 so that the downlink signal having DL1 and DL2 band components is transmitted into the downlink band pass filter element 242.

Downlink band pass filter 242 is tuned to pass the DL2 band but filter out RF signals in the DL1 band so that any component of DL1 exiting out from downlink band pass filter 242 is attenuated below a threshold power level (for example, a level at which the signal would be considered a spurious emission). One of ordinary skill in the art would be able to determine the threshold power level for the signal to be considered negligible (e.g. at the level of a spurious emission). When suppression of public safety coverage signals is not desired, band suppression controller 230 switches the one or more downlink suppression selection switches 244 so that the downlink signal having DL1 and DL2 band components is instead transmitted through the first matching attenuator 243 to the power amplifier 211 so that DL1 and DL2 signals are provided to the power amplifier 211 and then radiated by antenna 119 at full nominal power (e.g. +30 dBm signal per carrier). Because the first matching attenuator 243 comprises an insertion loss equivalent to the insertion loss of the downlink band pass filter 242, there is no change in the power level of the DL2 (private safety cover signal) transmitted by remote antenna unit 200 due to the switching the DL1 band between the on (i.e. full nominal power) or off (i.e. suppressed) states.

In one embodiment, an uplink signal having UL1 and UL2 band components is received at band suppression element 223. When suppression of public safety coverage signals is needed, band suppression controller 230 switches the one or more uplink suppression selection switches 247 so that the uplink signal having UL1 and UL2 band components is transmitted into the uplink band pass filter 245.

Uplink band pass filter 245 is tuned to pass the UL2 band but filter out RF signals in the UL1 band so that any component of UL1 exiting out from uplink band pass filter 245 is attenuated below a threshold power level (for example, a level at which the signal would be considered a spurious emission). One of ordinary skill in the art would be able to determine the threshold power level for the signal to be considered negligible (e.g. at the level of a spurious emission). When suppression of public safety coverage signals is not desired, band suppression controller 230 switches the one or more uplink suppression selection switches 247 so that the uplink signal having UL1 and UL2 band components is instead transmitted through the second matching attenuator 246 so that UL1 and UL2 signals are provided from the LNA 122 to the OTRX 210 and then transmitted to the master unit 110. Because the second matching attenuator 246 comprises an insertion loss equivalent to the insertion loss of the uplink band pass filter 245, there is no change in the power level of the UL2 (private safety cover signal) received by the master unit 110 due to the switching the UL1 band between on (i.e. nominal power) or off (i.e. suppressed) states.

In one embodiment, band suppression controller 230 responds to management data which may be received by DAS 100 is multiple different ways. For example, in one embodiment, DAS 100 receives management data for activating or deactivating the UL1 and DL1 bands for select RAUs 112 through input entered by an operator into one of the OCP 131 coupled to the master unit 110 via OCP interface 150, an RAU 112, or an expansion unit 113. Alternatively, management data for activating or deactivating the UL1 and DL1 bands may be communicated via one of the modems 135 used for the purpose of communicating management data. As another alternative, management data for activating or deactivating the UL1 and DL1 bands may be received by the master unit 110 from one of the base stations 140. Management data comprising instruction to activate/deactivate the UL1 and DL1 bands may then be transmitted to the affected RAU 112 where the controller 230 responds by suppressing the UL1 and DL1 bands (for example, in any manner discussed above).

In some embodiments, instruction to activate/deactivate the UL1 and DL1 bands are addressed to specific RAU 112 of the DAS 100 so that only those RAU 112 respond to the instructions. In other embodiments, the band suppression module 120 in one or more of the RAU 112 may be programmed with a default and one or more emergency event configurations that depend on their physical location. For example, a first RAU 112 of DAS 100 may be physically located inside a facility, but at a location where one or more of its operating bands can potentially interfere with those of local base stations outside of the facility (for example, the first RAU 112 is located in an above ground segment of a subway system). The band suppression controller 230 may have stored in a memory 231 a default first configuration with settings that configure BSM 120 to suppress UL1 and DL1 under nominal default conditions, and a second configuration with settings that configured BSM 120 to pass UL1 and DL1 without suppression under a specified event condition. At the same time, a second RAU 112 of DAS 100 may be physically located inside a facility at a position where it cannot interfere with those of local base stations outside of the facility (for example, the second RAU 112 is located in an underground segment of a subway system). The band suppression controller 230 for this second RAU 112 may have stored in memory 231 a default first configuration with setting that configure its BSM 120 to pass UL1 and DL1 without suppression under nominal default conditions, and a second configuration with setting that also configure BSM 120 to pass UL1 and DL1 without suppression under the specified event condition. In this way, the DAS 100 may simply communicate blanket message to all RAU 112 to either enter an event configuration state, or return to their default configuration state, and each RAU 112 will respond accordingly and consistent with how the default configuration and event configuration are particularly defined within their specific BSM 120. It should also be understood that more than one event configuration may be defined within each RAU 112 and the RAU 112 could therefor configure itself based on which event is identified in the activate/deactivate instruction it receives.

Figure 2C:
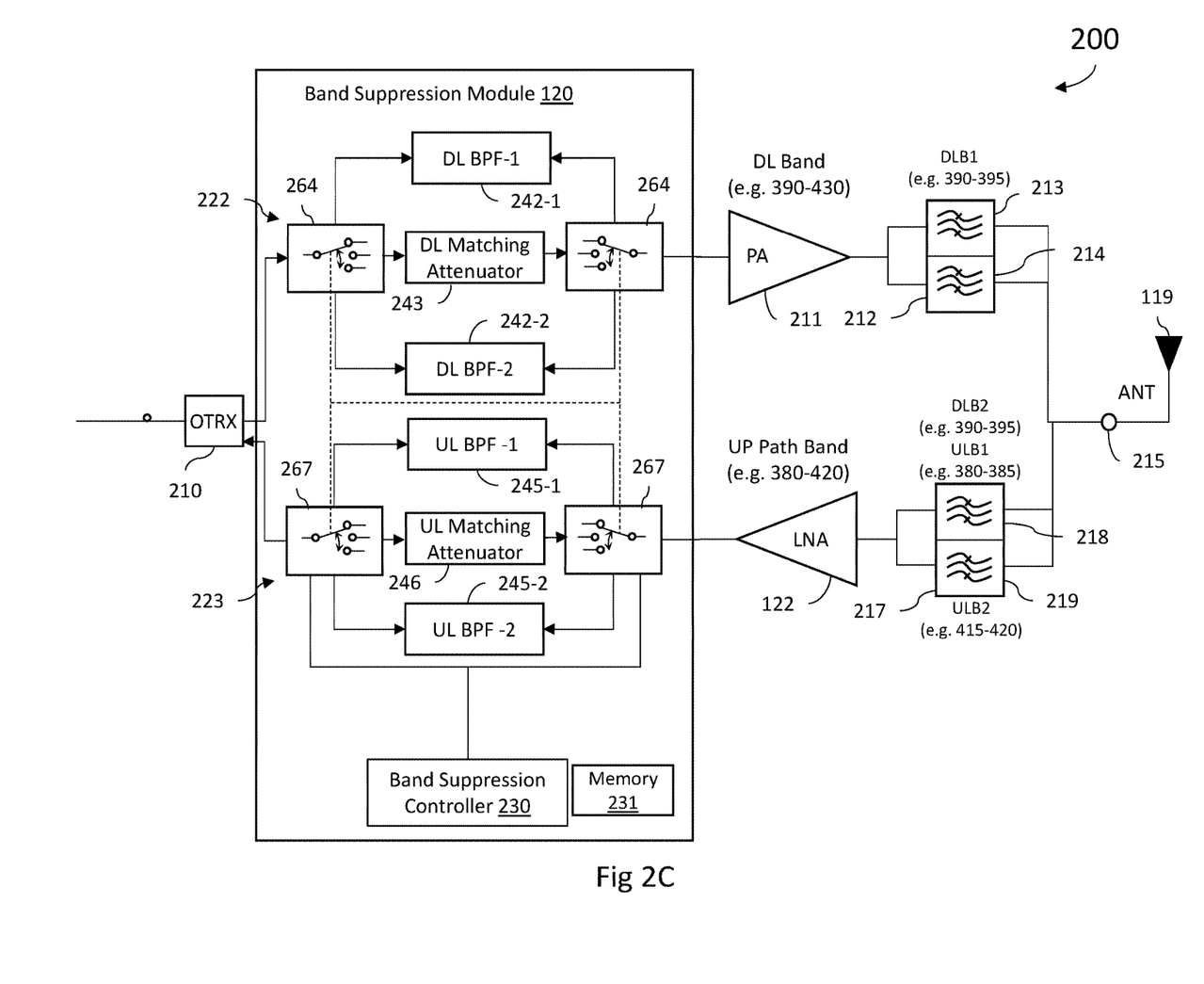

FIG. 2C illustrates another example embodiment of the remote antenna unit 200 where the band suppression module 120 can be switched into multiple alternate modes where either the UL1 & DL1 bands are suppressed, the UL2 & DL2 bands are suppressed, or neither set of bands are suppressed.

In this example embodiment, band suppression module 120 comprises a downlink signal path that includes a first downlink band pass filter element 242-1, a second downlink band pass filter element 242-2, a first matching attenuator 243 having an insertion loss equivalent to the insertion loss of the downlink band pass filter elements 242-1 and 242-2, and one or more downlink suppression selection switches 264 coupled to and operated by the band suppression controller 230. Band suppression module 120 further comprises an uplink signal path that includes a first uplink band pass filter element 245-1, a second uplink band pass filter element 245-2, a second matching attenuator 246 having an insertion loss equivalent to the insertion loss of the uplink band pass filter elements 245-1 and 245-2, and one or more uplink suppression selection switches 267 coupled to an operated by the band suppression controller 230.

In one embodiment, a downlink signal having DL1 and DL2 band components is received at band suppression element 222. When suppression of the DL1 band is needed, band suppression controller 230 switches the one or more downlink suppression selection switches 264 so that the downlink signal having DL1 and DL2 band components is transmitted into the downlink band pass filter element 242-1. Downlink band pass filter 242-1 is tuned to pass the DL2 band but filter out RF signals in the DL1 band so that any component of DL1 exiting out from downlink band pass filter 242 is attenuated below a threshold power level (for example, a level at which the signal would be considered a spurious emission). When suppression of the DL2 band is needed, band suppression controller 230 switches the one or more downlink suppression selection switches 264 so that the downlink signal having DL1 and DL2 band components is transmitted into the downlink band pass filter element 242-2. Downlink band pass filter 242-2 is tuned to pass the DL1 band but filter out RF signals in the DL2 band so that any component of DL2 exiting out from downlink band pass filter 242 is attenuated below a threshold power level (for example, a level at which the signal would be considered a spurious emission). One of ordinary skill in the art would be able to determine the threshold power level for the signal to be considered negligible (e.g. at the level of a spurious emission).

When suppression of neither DL1 nor DL2 is desired, band suppression controller 230 switches the one or more downlink suppression selection switches 264 so that the downlink signal having DL1 and DL2 band components is instead transmitted through the first matching attenuator 243 to the power amplifier 211 so that DL1 and DL2 signals are provided to the power amplifier 211 and then radiated by antenna 119 at full nominal power (e.g. +30 dBm signal per carrier). Because the first matching attenuator 243 comprises an insertion loss equivalent to the insertion loss of the downlink band pass filter 242-1 and/or downlink band pass filter 242-2, there is no change in the power level of the DL1 or DL2 signals transmitted by remote antenna unit 200 due to the switching.

In one embodiment, an uplink signal having UL1 and UL2 band components is received at band suppression element 223. When suppression of the UL1 band is needed, band suppression controller 230 switches the one or more uplink suppression selection switches 267 so that the uplink signal having UL1 and UL2 band components is transmitted into the uplink band pass filter 245-1. Uplink band pass filter 245-1 is tuned to pass the UL2 band but filter out RF signals in the UL1 band so that any component of UL1 exiting out from uplink band pass filter 245-1 is attenuated below a threshold power level (for example, a level at which the signal would be considered a spurious emission). When suppression of the UL2 band is needed, band suppression controller 230 switches the one or more uplink suppression selection switches 267 so that the uplink signal having UL1 and UL2 band components is transmitted into the uplink band pass filter 245-2. Uplink band pass filter 245-2 is tuned to pass the UL1 band but filter out RF signals in the UL2 band so that any component of UL2 exiting out from uplink band pass filter 245-2 is attenuated below a threshold power level. One of ordinary skill in the art would be able to determine the threshold power level for the signal to be considered negligible (e.g. at the level of a spurious emission).

When suppression of neither UL1 or UL2 is desired, band suppression controller 230 switches the one or more uplink suppression selection switches 267 so that the uplink signal having UL1 and UL2 band components is instead transmitted through the second matching attenuator 246 so that UL1 and UL2 signals are provided from the LNA 122 to the OTRX 210 and then transmitted to the master unit 110. Because the second matching attenuator 246 comprises an insertion loss equivalent to the insertion loss of the uplink band pass filter 245-1 and/or uplink band pass filter 245-2, there is no change in the power level of the UL1 or UL2 signals transmitted by remote antenna unit 200 due to the switching.

It should also be appreciated that other network architectures may be implemented that still functionally operate in the same manner as described in any of the embodiments described herein. It should also be understood that for any of the embodiments described herein, while the communication links connecting master units and remote antenna units may comprise optical fiber, in other embodiments other wired or wireless communication links, or combinations thereof, may be utilized instead of, or in combination with, optical fiber communication links.

As used herein, DAS related terms such as "master unit", "remote unit", "remote antenna unit" and "control unit" and "controller" refer to hardware elements that would be immediately recognized and understood by those of skill in the art of wireless communications and are not used herein as nonce words or nonce terms for the purpose of invoking 35 USC 112(f).

EXAMPLE EMBODIMENTS

Example 1 includes a distributed antenna system, the system comprising: at least one master unit configured to receive a base station downlink radio frequency signal and to transmit a base station uplink radio frequency signal; at least one remote antenna unit that is communicatively coupled to the at least one master unit, the remote antenna unit comprising a power amplifier and configured to radiate a remote downlink radio frequency signal from at least one antenna associated with the remote antenna unit, the remote antenna unit further configured to receive a remote uplink radio frequency signal from at least one antenna associated with the remote antenna unit, wherein the remote downlink radio frequency signal comprises a first downlink frequency band and a second downlink frequency band and wherein the remote uplink radio frequency signal comprises a first uplink frequency band and a second uplink frequency band; a band suppression module comprising: a band suppression controller; an uplink band suppression element controlled by the band suppression controller, wherein the uplink band suppression element is configured to apply an attenuation to suppress the first uplink frequency band in response to a signal from the band suppression controller; and a downlink band suppression element controlled by the band suppression controller, wherein the downlink band suppression element is configured to apply an attenuation to suppress the first downlink frequency band in response to the signal from the band suppression controller.

Example 2 includes the system of example 1, wherein the first downlink frequency band and the first uplink frequency band define a public safety communications band, and where the second downlink frequency band and the second uplink frequency band define a private safety communications band.

Example 3 includes the system of any of examples 1-2, wherein the band suppression controller comprises electronics responsive to a management signal received by the distributed antenna system, wherein the band suppression controller controls one or both of the uplink band suppression element and the downlink band suppression element in response to the management signal.

Example 4 includes the system of any of examples 1-3, wherein the band suppression module further comprises a memory coupled to the band suppression controller, the memory storing a plurality of configuration setting; wherein the band suppression controller selectively reads a configuration setting from the memory to control the uplink band suppression element and the downlink band suppression element.

Example 5 includes the system of any of examples 1-4, wherein the uplink band suppression element and the downlink band suppression element each further comprise: an RF network element; and at least one switchable load coupled to the RF network element; wherein the band suppression controller is configured to control application of the at least one switchable load to suppress one of the first uplink signal or the first downlink signal.

Example 6 includes the system of example 5, wherein the RF network element comprises either a circulator or a hybrid coupler.

Example 7 includes the system of any of examples 1-6, wherein the uplink band suppression element and the downlink band suppression element each further comprise: a band pass filter; a matching attenuator having an insertion loss equivalent to an insertion loss of the band pass filter; and one or more suppression selection switches coupled to the band pass filter and the matching attenuator, wherein the band suppression controller is configured to control the one or more suppression selection switches to toggle between the band pass filter and the matching attenuator.

Example 8 includes the system of any of examples 1-7, wherein the uplink band suppression element is further configured to pass the second uplink frequency band and the downlink band suppression element is further configured to pass the second downlink frequency band.

Example 9 includes the system of any of examples 1-8, wherein the uplink band suppression element and the downlink band suppression element each further comprise: a first band pass filter; a second band pass filter; a matching attenuator having an insertion loss equivalent to an insertion loss of either the first band pass filter or the second band pass filter; and one or more suppression selection switches coupled to the band pass filter and the matching attenuator, wherein the band suppression controller is configured to control the one or more suppression selection switches to switch between selection of the first band pass filter, the second band pass filter, of the matching attenuator, in response to the signal from the band suppression controller.

Example 10 includes a method for selectable band suppression for a distributed antenna system comprising at least one master unit and at least one remote antenna unit that is communicatively coupled to the at least one master unit, the at least one remote antenna unit carrying a remote downlink radio frequency signal comprising a first downlink frequency band and a second downlink frequency band, and a remote uplink radio frequency signal comprising a first uplink frequency band and a second uplink frequency band, the method comprising: determining whether the distributed antenna system is operating under a first status condition or a second status condition; when the distributed antenna system is determined to be operating under the first status condition, controlling at least one radio frequency (RF) band suppression element to suppress the first downlink frequency band and the first uplink frequency band while passing the second downlink frequency band and the second uplink frequency band; when the distributed antenna system is determined to be operating under the second status condition, controlling at least one radio frequency (RF) band suppression element to pass the first downlink frequency band, the first uplink frequency band, the second downlink frequency band and the second uplink frequency band.

Example 11 includes the method of example 10, wherein the first downlink frequency band and the first uplink frequency band define a public safety communications band, and where the second downlink frequency band and the second uplink frequency band define a private safety communications band.

Example 12 includes the method of any of examples 10-11, wherein the at least one remote antenna unit comprises a band suppression module comprising: a band suppression controller; an uplink band suppression element controlled by the band suppression controller, wherein the uplink band suppression element is configured to apply an attenuation to suppress the first uplink frequency band in response to a signal from the band suppression controller; and a downlink band suppression element controlled by the band suppression controller, wherein the downlink band suppression element is configured to apply an attenuation to suppress the first downlink frequency band in response to the signal from the band suppression controller.

Example 13 includes the method of example 12, further comprising: generating the signal from the in response to a management signal received by the band suppression controller.

Example 14 includes the method of any of examples 12-13, further comprising: in response to determining whether the distributed antenna system is operating under a first status condition or a second status condition, reading a configuration setting from a memory; and controlling the uplink band suppression element and the downlink band suppression element based on the configuration setting.

Example 15 includes the method of any of examples 12-14, wherein the uplink band suppression element and the downlink band suppression element each further comprise: an RF network element; and at least one switchable load coupled to the RF network element; wherein the band suppression controller is configured to control application of the at least one switchable load to suppress one of the first uplink signal or the first downlink signal.

Example 16 includes the method of example 16, wherein the RF network element comprises either a circulator or a hybrid coupler.

Example 17 includes the method of any of examples 12-16, wherein the uplink band suppression element and the downlink band suppression element each further comprise: a band pass filter; a matching attenuator having an insertion loss equivalent to an insertion loss of the band pass filter; and one or more suppression selection switches coupled to the band pass filter and the matching attenuator, wherein the band suppression controller is configured to control the one or more suppression selection switches to toggle between the band pass filter and the matching attenuator.

Example 18 includes the method of any of examples 12-17, further comprising determining whether the distributed antenna system is operating under the first status condition, the second status condition, or a third condition; when the distributed antenna system is determined to be operating under the third status condition, controlling at least one radio frequency (RF) band suppression element to suppress the second downlink frequency band and the second uplink frequency band while passing the first downlink frequency band and the first uplink frequency band.

Example 19 includes the method of example 18, wherein the at least one remote antenna unit comprises a band suppression module comprising: a band suppression controller; an uplink band suppression element controlled by the band suppression controller, wherein the uplink band suppression element is configured to apply an attenuation to selectively suppress either the first uplink frequency band or the second uplink frequency band in response to a signal from the band suppression controller; and a downlink band suppression element controlled by the band suppression controller, wherein the downlink band suppression element is configured to apply an attenuation to selectively suppress either the first downlink frequency band or the second downlink frequency band in response to the signal from the band suppression controller.

Example 20 includes the method of example 19, wherein the uplink band suppression element and the downlink band suppression element each further comprise: a first band pass filter; a second band pass filter; a matching attenuator having an insertion loss equivalent to an insertion loss of either the first band pass filter or the second band pass filter; and one or more suppression selection switches coupled to the first band pass filter, the second band pass filter, and the matching attenuator, wherein the band suppression controller is configured to control the one or more suppression selection switches to switch between selection of the first band pass filter, the second band pass filter, or the matching attenuator, in response to the signal from the band suppression controller.

Example 21 includes a band suppression module for a distributed antenna system, the module comprising: a band suppression controller; an uplink radio frequency band suppression element controlled by the band suppression controller, wherein the uplink band suppression element is configured to apply an attenuation to suppress a first downlink frequency band in response to a signal from the band suppression controller while passing a second downlink frequency band; and a downlink radio frequency band suppression element controlled by the band suppression controller, wherein the uplink band suppression element is configured to apply an attenuation to suppress the first downlink frequency band in response to the signal from the band suppression controller while passing a second uplink frequency band.

Example 22 includes the module of example 21, wherein the band suppression controller comprises electronics responsive to a management signal received by the distributed antenna system, wherein the band suppression controller controls one or both of the uplink band suppression element and the downlink band suppression element in response to the management signal.

Example 23 includes the module of any of examples 21-22, wherein the band suppression module further comprises a memory coupled to the band suppression controller, the memory storing a plurality of configuration setting; wherein the band suppression controller selectively reads a configuration setting from the memory to control the uplink band suppression element and the downlink band suppression element.

Example 24 includes the module of any of examples 21-23, wherein the uplink band suppression element and the downlink band suppression element each further comprise: an RF network element; and at least one switchable load coupled to the RF network element; wherein the band suppression controller is configured to control application of the at least one switchable load to suppress one of the first uplink signal or the first downlink signal.

Example 25 includes the module of example 24, wherein the RF network element comprises either a circulator or a hybrid coupler.

Example 26 includes the module of any of examples 21-25, wherein the uplink band suppression element and the downlink band suppression element each further comprise: a band pass filter; a matching attenuator having an insertion loss equivalent to an insertion loss of the band pass filter; and one or more suppression selection switches coupled to the band pass filter and the matching attenuator, wherein the band suppression controller is configured to control the one or more suppression selection switches to toggle between the band pass filter and the matching attenuator.

Example 27 includes the module of any of examples 21-26, wherein the uplink band suppression element and the downlink band suppression element each further comprise: a first band pass filter; a second band pass filter; a matching attenuator having an insertion loss equivalent to an insertion loss of either the first band pass filter or the second band pass filter; and one or more suppression selection switches coupled to the first band pass filter, the second band pass filter, and the matching attenuator, wherein the band suppression controller is configured to control the one or more suppression selection switches to switch between selection of the first band pass filter, the second band pass filter, or the matching attenuator, in response to the signal from the band suppression controller.

In various alternative embodiments, system and/or device elements, method steps, or example implementations described throughout this disclosure (such as any of the master units, remote antenna units, controllers, circuitry, band suppression module, control units or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

The invention claimed is:

1. A band suppression module for an antenna system, the module comprising:
   a radio frequency (RF) band suppression circuit that switches between a first state and a second state in response to a band suppression controller;
   wherein in the first state, the RF band suppression circuit passes signals in each of a plurality of uplink frequency bands and in each of a plurality of downlink frequency bands;
   wherein in the second state, the RF band suppression circuit:
      suppresses a first uplink frequency band of the plurality of uplink frequency bands while passing a second uplink frequency band of the plurality of uplink frequency bands; and
      suppresses a first downlink frequency band of the plurality of downlink frequency bands while passing a second downlink frequency band of the plurality of downlink frequency bands.

2. The module of claim 1, wherein the band suppression controller comprises electronics responsive to a management signal received by the antenna system,
   wherein the band suppression controller switches the RF band suppression circuit between the first state and the second state in response to the management signal.

3. The module of claim 1, wherein the band suppression module further comprises a memory coupled to the band suppression controller, the memory storing a plurality of configuration setting;
   wherein the band suppression controller selectively reads a configuration setting from the memory to control the RF band suppression circuit.

4. The module of claim 1, wherein the RF band suppression circuit further comprises:
   a band pass filter;
   a matching attenuator having an insertion loss equivalent to an insertion loss of the band pass filter; and
   one or more suppression selection switches coupled to the band pass filter and the matching attenuator, wherein the band suppression controller is configured to control the one or more suppression selection switches to toggle between the band pass filter and the matching attenuator.

5. The module of claim 1, wherein the RF band suppression circuit further comprises:
   a first band pass filter;
   a second band pass filter;
   a matching attenuator having an insertion loss equivalent to an insertion loss of either the first band pass filter or the second band pass filter; and
   one or more suppression selection switches coupled to the first band pass filter, the second band pass filter, and the matching attenuator, wherein the band suppression controller is configured to control the one or more suppression selection switches to switch between selection of the first band pass filter, the second band pass filter, or the matching attenuator, in response to the signal from the band suppression controller.

6. The module of claim 1, wherein the RF band suppression circuit further comprises:
   a RF network element; and
   at least one switchable load coupled to the RF network element;
   wherein the band suppression controller is configured to control application of the at least one switchable load to suppress RF signals in one of the first uplink frequency band or the first downlink frequency band.

7. The module of claim 1, wherein the antenna system comprises at least one master unit configured to receive a base station downlink RF signal and to transmit a base station uplink RF signal, wherein the antenna system comprises at least one remote antenna unit that is communicatively coupled to the at least one master unit;
   wherein the at least one remote antenna unit comprises a power amplifier and is configured to radiate a remote downlink RF signal from at least one antenna associated with the remote antenna unit, the remote antenna unit further configured to receive a remote uplink RF signal from at least one antenna associated with the remote antenna unit, wherein the remote downlink RF signal comprises the first downlink frequency band and the second downlink frequency band and wherein the remote uplink RF signal comprises the first uplink frequency band and the second uplink frequency band; and wherein the RF band suppression circuit is a component of a first remote antenna unit of the at least one remote antenna unit.

8. The module of claim 7, wherein the first downlink frequency band and the first uplink frequency band define a public safety communications band, and where the second downlink frequency band and the second uplink frequency band define a private safety communications band.

9. A method for selectable band suppression for an antenna system, the method comprising:
controlling at least one radio frequency (RF) band suppression circuit to switch at least between:
suppressing a first downlink frequency band in a plurality of downlink frequency bands and a first uplink frequency band in a plurality of uplink frequency bands while passing a second downlink frequency band in the plurality of downlink frequency bands and a second uplink frequency band in the plurality of uplink frequency bands; and
passing the first downlink frequency band, the first uplink frequency band, the second downlink frequency band, and the second uplink frequency band.

10. The method of claim 9, further comprising:
determining a status condition of the antenna system; and
controlling switching in response to the status condition.

11. The method of claim 10, further comprising:
in response to determining the status condition of the antenna system, reading a configuration setting from a memory; and
controlling the at least one RF band suppression circuit based on the configuration setting.

12. The method of claim 9, wherein the first downlink frequency band and the first uplink frequency band define a public safety communications band, and where the second downlink frequency band and the second uplink frequency band define a private safety communications band.

13. The method of claim 9, wherein the antenna system comprises:
at least one master unit and at least one remote antenna unit that is communicatively coupled to the at least one master unit, the at least one remote antenna unit carrying a remote downlink RF signal comprising the first downlink frequency band and the second downlink frequency band, and a remote uplink RF signal comprising the first uplink frequency band and the second uplink frequency band.

14. The method of claim 13, wherein the at least one remote antenna unit comprises a band suppression module comprising:
a RF band suppression circuit configurable to switch between a first state and a second state in response to a band suppression controller;
wherein in the first state, the RF band suppression circuit passes signals in each of a plurality of uplink frequency bands and in each of a plurality of downlink frequency bands;
wherein in the second state, the RF band suppression circuit:
suppresses the first uplink frequency band of the plurality of uplink frequency bands while passing the second uplink frequency band of the plurality of uplink frequency bands; and
suppresses the first downlink frequency band of the plurality of downlink frequency bands while passing the second downlink frequency band of the plurality of downlink frequency bands.

15. The method of claim 14, further comprising:
controlling the RF band suppression circuit in based on a signal from a band suppression controller.

16. The method of claim 14, wherein the RF band suppression controller comprises electronics responsive to a management signal received by the antenna system,
wherein the band suppression controller switches the RF band suppression circuit in response to the management signal.

17. The method of claim 9, wherein the RF band suppression circuit further comprises:
an RF network element; and
at least one switchable load coupled to the RF network element;
wherein a band suppression controller is configured to control application of the at least one switchable load to suppress one of the first uplink signal or the first downlink signal.

18. The method of claim 9, wherein the RF band suppression circuit further comprises:
a band pass filter;
a matching attenuator having an insertion loss equivalent to an insertion loss of the band pass filter; and
one or more suppression selection switches coupled to the band pass filter and the matching attenuator, wherein the band suppression controller is configured to control the one or more suppression selection switches to toggle between the band pass filter and the matching attenuator.

19. The method of claim 9 wherein the RF band suppression circuit further comprises:
a first band pass filter;
a second band pass filter;
a matching attenuator having an insertion loss equivalent to an insertion loss of either the first band pass filter or the second band pass filter; and
one or more suppression selection switches coupled to the first band pass filter, the second band pass filter, and the matching attenuator;
the method further comprising:
controlling the one or more suppression selection switches to switch between selection of the first band pass filter, the second band pass filter, or the matching attenuator, in response to a signal from a band suppression controller.

20. The method of claim 9, further comprising:
determining whether the antenna system is operating under a first status condition, a second status condition, or a third status condition;
when the antenna system is determined to be operating under the first status condition, controlling at least one RF band suppression circuit to suppress the first downlink frequency band and the first uplink frequency band while passing the second downlink frequency band and the second uplink frequency band;
when the distributed antenna system is determined to be operating under the second status condition, controlling at least one RF band suppression circuit to pass the first downlink frequency band, the first uplink frequency band, the second downlink frequency band and the second uplink frequency band; and when the distributed antenna system is determined to be operating under the third status condition, controlling at least RF band suppression circuit to suppress the second downlink frequency band and the second uplink frequency band while passing the first downlink frequency band and the first uplink frequency band.

* * * * *